US007764617B2

(12) United States Patent (10) Patent No.: US 7,764,617 B2
Cain et al. (45) Date of Patent: Jul. 27, 2010

(54) MOBILE AD-HOC NETWORK AND METHODS FOR PERFORMING FUNCTIONS THEREIN BASED UPON WEIGHTED QUALITY OF SERVICE METRICS

(75) Inventors: Joseph Bibb Cain, Indialantic, FL (US); Thomas Jay Billhartz, Melbourne, FL (US); Robert Alex Kennedy, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 1611 days.

(21) Appl. No.: 10/174,721

(22) Filed: Jun. 19, 2002

(65) Prior Publication Data

US 2003/0202468 A1 Oct. 30, 2003

Related U.S. Application Data

(63) Continuation-in-part of application No. 10/134,715, filed on Apr. 29, 2002, now Pat. No. 6,954,435, and a continuation-in-part of application No. 10/134,559, filed on Apr. 29, 2002, now Pat. No. 7,281,057.

(51) Int. Cl.
*H04L 12/26* (2006.01)
*G06F 15/173* (2006.01)
(52) U.S. Cl. .................................. 370/238; 709/241
(58) Field of Classification Search ........................ None
See application file for complete search history.

(56) References Cited

U.S. PATENT DOCUMENTS 5,412,654 A   5/1995  Perkins ...................... 370/94.1

5,987,011 A   11/1999  Toh ........................... 370/331

(Continued)

FOREIGN PATENT DOCUMENTS

WO          03/093926          11/2003

OTHER PUBLICATIONS

Zhu, *Medium Access Control and Quality-of-Service Routing for Mobile Ad Hoc Networks*, PhD thesis, Department of Computer Engineering, University of Maryland, College Park, MD, 2001.

(Continued)

*Primary Examiner*—Ricky Ngo
*Assistant Examiner*—Clemence Han
(74) *Attorney, Agent, or Firm*—Allen, Dyer, Doppelt, Milbrath & Gilchrist, P.A.

(57) ABSTRACT

A method is provided for communicating between a source node and a destination node in a mobile ad-hoc network. The method may include transmitting a quality-of-service (QoS) route request from the source node to the destination node via a plurality of intermediate nodes therebetween to discover routing to the destination node based upon a plurality of QoS parameters. Responsive to the QoS route request, a plurality of potential routes between the source node and the destination node may be determined along with a QoS metric corresponding to each of the QoS parameters for each potential route. Further, the QoS parameters may be ranked in an order of importance, and each of the QoS metrics weighted based upon the ranking of QoS parameters. As such, the weighted QoS metrics may be compared, and one of the potential routes may be selected based thereon for the transmission of message data.

43 Claims, 8 Drawing Sheets

U.S. PATENT DOCUMENTS

| | | | | |
|---|---|---|---|---|
| 6,094,687 | A * | 7/2000 | Drake et al. | 709/241 |
| 6,304,556 | B1 | 10/2001 | Haas | 370/254 |
| 6,363,319 | B1 * | 3/2002 | Hsu | 701/202 |
| 6,385,174 | B1 | 5/2002 | Li | 370/252 |
| 6,385,201 | B1 * | 5/2002 | Iwata | 370/400 |
| 6,633,544 | B1 * | 10/2003 | Rexford et al. | 370/238 |
| 6,678,252 | B1 * | 1/2004 | Cansever | 370/253 |
| 6,687,229 | B1 * | 2/2004 | Kataria et al. | 370/238 |
| 6,697,335 | B1 * | 2/2004 | Ergun et al. | 370/238 |
| 6,813,272 | B1 * | 11/2004 | An et al. | 370/395.21 |
| 7,047,316 | B2 * | 5/2006 | Iwata et al. | 709/240 |
| 7,113,796 | B2 * | 9/2006 | Zhang et al. | 455/456.2 |
| 7,336,613 | B2 * | 2/2008 | Lloyd et al. | 370/237 |
| 2001/0033556 | A1 | 10/2001 | Krishnamurthy et al. | 370/329 |
| 2002/0101822 | A1 * | 8/2002 | Ayyagari et al. | 370/235 |
| 2003/0156543 | A1 * | 8/2003 | Sahinoglu et al. | 370/238 |
| 2004/0095907 | A1 * | 5/2004 | Agee et al. | 370/334 |
| 2005/0160154 | A1 * | 7/2005 | Raciborski et al. | 709/219 |

OTHER PUBLICATIONS

Mirhakkak et al., *Dynamic Quality-of-Service for Mobile Ad Hoc Networks*, MITRE Corp., 2000.

Das et al., *Routing in Ad-Hoc Networks Using Minimum Connected Dominating Sets*, IEEE Int. Conf. on Commun. (ICC '97), 1997.

Das et al., *Routing in Ad-Hoc Networks Using a Spine*, IEEE Int. Conf. on Computer Commun. and Networks (IC3N '97), 1997.

Raghunathan et al., *Gateway Routing: A Cluster Based Mechanism for Recovery from Mobile Host Partitioning in Cellular Networks*, Proceedings of the 3$^{rd}$ IEEE Symposium on Application-Specific Systems and Software Engineering Technology (ASSET'00), 2000.

Chen et al., *Clustering and Routing in Mobile Wireless Networks*, Nortel Networks and Computer Science, SITE, University of Ottawa, (no date available).

Krishna et al., *A Cluster Based Approach for Routing in Dynamic Networks*, ACM Computer Communications Review, 27(2), Apr. 1997.

Chiang, *Routing in Clustered Multihop, Mobile Wireless Networks with Fading Channel*, Proceedings of IEEE SICON '97, Apr. 1997, pp. 36-45.

Gerla, *Clustering and Routing in Large Ad Hoc Wireless Nets*, Computer Science Department, University of California, Los Angeles, Final Report 1998-99 for MICRO project 98-044.

Van Dyck et al., *Distributed Sensor Processing Over an Ad-Hoc Wireless Network: Simulation Framework and Performance Criteria*, Proceedings IEEE Milcom, Oct. 2001.

Lin et al., *Adaptive Clustering for Mobile Wireless Networks*, IEEE Journal on Selected Areas in Communications, 15(7), Sep. 1997.

McDonald, *PhD. Dissertation Proposal: A Mobility-Based Framework for Adaptive Dynamic Cluster-Based Hybrid Routing in Wireless Ad-Hoc Networks*, University of Pittsburgh, 1999.

Royer et al., *A Review of Current Routing Protocols for Ad Hoc Mobile Wireless Networks*, IEEE Personal Communications, Apr. 1999, pp. 46-55.

Corson et al., *A Reservation-Based Multicast (RBM) Routing Protocol for Mobile Networks: Initial Route Constructions Phase*, ACM/I.1, No. 4, 1995, pp. 1-39.

Xiao et al., *A Flexible Quality of Service Model for Mobile Ad Hoc Networks*, IEEE VTC2000-spring, Tokyo, Japan, May 2000.

Wu et al., *QoS Support in Mobile Ad Hoc Networks*, Computing Science Department, University of Alberta, (no date available).

Corson et al., *Mobile Ad Hoc Networking (MANET): Routing Protocol Performance Issues and Evaluation Considerations*, Network Working Group, Internet Engineering Task Force (IETF) MANET Working Group, Internet Draft, Jan. 1999.

Haas et al., *The Bordercast Resolution Protocol (BRP) for Ad Hoc Networks*, Internet Engineering Task Force (IETF) MANET Working Group, Internet Draft, Jun. 2001.

Haas et al., *The Interzone Routing Protocol (IERP) for Ad Hoc Networks*, Internet Engineering Task Force (IETF) MANET Working Group, Internet Draft, Jun. 2001.

Haas et al., *The Intrazone Routing Protocol (IERP) for Ad Hoc Networks*, Internet Engineering Task Force (IETF) MANET Working Group, Internet Draft, Jun. 2001.

Clausen et al., *Optimized Link State Routing Protocol*, Internet Engineering Task Force (IETF) MANET Working Group, Internet Draft, Oct. 31, 2001.

Perkins et al., *Quality of Service in Ad hoc On-Demand Distance Vector Routing*, Internet Engineering Task Force (IETF) MANET Working Group, Internet Draft, Jul. 2000.

Park et al., *Temporally-Ordered Routing Algorithm (TORA) Versoin 1 Functional Specification*, Internet Engineering Task Force (IETF) MANET Working Group, Internet Draft, Jul. 20, 2001.

Ogier et al., *Topology Broadcast Based on Reserve-Path Forwarding (TBRPF)*, Internet Engineering Task Force (IETF) MANET Working Group, Internet Draft, Jan. 10, 2002.

Gerla et al., *Landmark Routing Protocol (LANMAR) for Large Scale Ad Hoc Networks*, Internet Engineering Task Force (IETF) MANET Working Group, Internet Draft, Dec. 17, 2001.

Hu et al., *Flow State in the Dynamic Socurce Routing Protocol for Mobile Ad Hoc Networks*, Internet Engineering Task Force (IETF) MANET Working Group, Internet Draft, Feb. 23, 2001.

Gerla et al., *Fisheye State Routing Protocol (FSR) for Ad Hoc Networks*, Internet Engineering Task Force (IETF) MANET Working Group, Internet Draft, Dec. 17, 2001.

Johnson et al., *The Dynamic Source Routing Protocol for Mobile Ad Hoc Networks (DSR)*, Internet Engineering Task Force (IETF) MANET Working Group, Internet Draft, Nov. 21, 2001.

Perkins et al., *Ad hoc On-Demand Distance Vector (ADOV) Routing*, Internet Engineering Task Force (IETF) MANET Working Group, Internet Draft, Nov. 9, 2001.

Chakrabarti et al., *"QoS Issues in Ad Hoc Wireless Networks"*, , IEEE Communications Magazine, (Feb. 2001), pp. 142-148.

Chen, *"Routing Support for Providing Guaranteed End-to-End Quality-of-Service,"* Ph.D. thesis, Univ. of Illinois at Urbana-Champaign, http://cairo.cs.uiuc.edu/papers/Scthesis.ps.1999.

Lin, *"Admission Control in Time-Slotted Multihop Mobile Networks"*, IEEE Service Center, Piscataway, NJ, vol. 19, No. 10, Oct. 2001, pp. 1974-1983, XP-001111265; ISSN: 0733-8716.

* cited by examiner

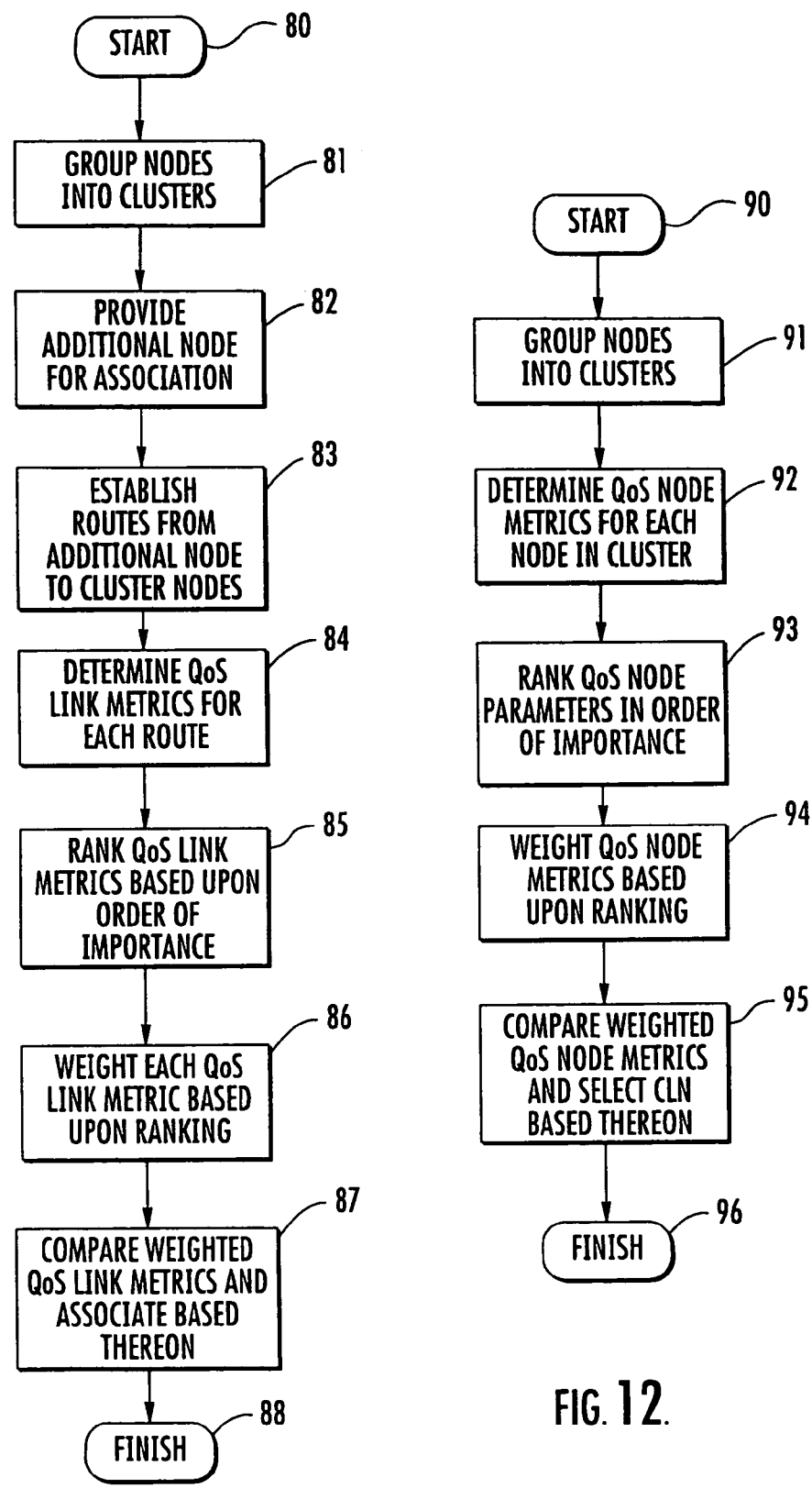

MOBILE AD-HOC NETWORK AND METHODS FOR PERFORMING FUNCTIONS THEREIN BASED UPON WEIGHTED QUALITY OF SERVICE METRICS

CROSS-REFERENCE TO RELATED APPLICATIONS

This application is a continuation-in-part of U.S. application Ser. No. 10/134,715, filed Apr. 29, 2002, now U.S. Pat. No. 6,954,435 and U.S. application Ser. No. 10/134,559, filed Apr. 29, 2002, now U.S. Pat. No. 7,281,057 both of which are hereby incorporated herein in their entireties by reference.

FIELD OF THE INVENTION

The present invention relates to the field of communication networks, and, more particularly, to mobile ad-hoc wireless networks and related methods.

BACKGROUND OF THE INVENTION

Wireless networks have experienced increased development in the past decade. One of the most rapidly developing areas is mobile ad-hoc networks. Physically, a mobile ad-hoc network includes a number of geographically-distributed, potentially mobile nodes sharing a common radio channel. Compared with other type of networks, such as cellular networks or satellite networks, the most distinctive feature of mobile ad-hoc networks is the lack of any fixed infrastructure. The network is formed of mobile nodes only, and a network is created on the fly as the nodes transmit with each other. The network does not depend on a particular node and dynamically adjusts as some nodes join or others leave the network.

In a hostile environment where a fixed communication infrastructure is unreliable or unavailable, such as in a battle field or in a natural disaster area struck by earthquake or hurricane, an ad-hoc network can be quickly deployed and provide limited but much needed communications. While the military is still a major driving force behind the development of these networks, ad-hoc networks are quickly finding new applications in civilian or commercial areas. Ad-hoc networks will allow people to exchange data in the field or in a class room without using any network structure except the one they create by simply turning on their computers or PDAs.

As wireless communication increasingly permeates everyday life, new applications for mobile ad-hoc networks will continue to emerge and become an important part of the communication structure. Mobile ad-hoc networks pose serious challenges to the designers. Due to the lack of a fixed infrastructure, nodes must self-organize and reconfigure as they move, join or leave the network. All nodes are essentially the same and there is no natural hierarchy or central controller in the network. All functions have to be distributed among the nodes. Nodes are often powered by batteries and have limited communication and computation capabilities. The bandwidth of the system is usually limited. The distance between two nodes often exceeds the radio transmission range, and a transmission has to be relayed by other nodes before reaching its destination. Consequently, a network has a multihop topology, and this topology changes as the nodes move around.

The Mobile Ad-Hoc Networks (MANET) working group of the Internet Engineering Task Force (IETF) has been actively evaluating and standardizing routing, including multicasting, protocols. Because the network topology changes arbitrarily as the nodes move, information is subject to becoming obsolete, and different nodes often have different views of the network, both in time (information may be outdated at some nodes but current at others) and in space (a node may only know the network topology in its neighborhood and not far away from itself).

A routing protocol needs to adapt to frequent topology changes and with less accurate information. Because of these unique requirements, routing in these networks are very different from others. Gathering fresh information about the entire network is often costly and impractical. Many routing protocols are reactive (on-demand) protocols: they collect routing information only when necessary and to destinations they need routes to, and do not maintain unused routes. This way the routing overhead is greatly reduced compared to pro-active protocols which maintain optimal routes to all destinations at all time. This is important for a protocol to be adaptive. Ad Hoc on Demand Distance Vector (AODV), Dynamic Source Routing (DSR) and Temporally Ordered Routing Algorithm (TORA) are representatives of on-demand routing protocols presented at the MANET working group.

Examples of other various routing protocols include Destination Sequenced Distance-Vector (DSDV) routing which is disclosed in U.S. Pat. No. 5,412,654 to Perkins, and Zone Routing Protocol (ZRP) which is disclosed in U.S. Pat. No. 6,304,556 to Haas. ZRP is a hybrid protocol using both pro-active and reactive approaches.

These conventional routing protocols use a best effort approach in selecting a route from the source node to the destination node. Typically, the number of hops is the main criteria in such a best effort approach. In other words, the route with the least amount of hops is selected as the transmission route.

Quality-of-service (QoS) routing in mobile ad-hoc networks is gaining interest. To provide quality-of-service, the protocol needs not only to find a route but also to secure the resources along the route. Because of the limited, shared bandwidth of the network, and lack of central controller which can account for and control these limited resources, nodes must negotiate with each other to manage the resources required for QoS routes. This is further complicated by frequent topology changes. Due to these constraints, QoS routing is more demanding than best-effort routing.

Some examples of QoS routing approaches are set forth by Chenxi Zhu in the publication entitled "Medium Access Control and Quality-of-Service Routing for Mobile Ad Hoc Networks," 2001, and by M. Mirhakkak et al. in the publication entitled "Dynamic Quality-of-Service for Mobile Ad Hoc Networks," MITRE Corp., 2000. Zhu discusses establishing bandwidth guaranteed QoS routes in small networks whose topologies change at a low to medium rate. Mirhakkak et al. are concerned with resource reservation requests which specify a range of QoS values while the network makes a commitment to provide service within this range.

At each node, admission control is performed to forward traffic from other nodes. Typically, conventional admission control protocols provide for full disclosure regarding routes and connectivity. In other words, each node shares all route and connectivity data with other nodes so that the best-effort routes are selected overall.

A challenge to the advancement of ad-hoc network development is that of extending such networks to encompass large numbers of nodes. One prior art attempt to do so utilizes "spine" routing, such as in the optimal spine routing (OSR) approach disclosed by Das et al. in "Routing in Ad-Hoc Networks using Minimum Connected Dominating Sets," *IEEE Int. Conf. On Commun.* (ICC '97), 1997. In this approach, a spine or "virtual backbone" is defined such that each network node is no more than one hop from a spine node. Global topology (link state) is maintained at each spine node, and a link-state routing algorithm is run at each spine node to produce current routes to every destination.

Another related approach is clustered spine routing (CSR), which is disclosed by Das et al. in "Routing in Ad-Hoc Networks using a Spine," *IEEE Int. Conf. On Computer Commun. and Networks* (IC3N '97), 1997. this approach is intended to extend the applicability of spine routing to larger network sizes by grouping the nodes in clusters and adding a second hierarchical level to the OSR approach. Yet another approach is known as partial knowledge spine routing (PSR) which is disclosed by Sivakumar et al. in "The Clade Vertebrata: Spines and Routing in Ad-Hoc Networks," *IEEE Symposium On Computer and Commun.*, 1998.

One common characteristic of each of the above prior art cluster/spine approaches is that they each rely on proactive routing. One potential drawback of proactive routing is that it typically requires a significant amount of routing overhead to maintain optimal routes to all destinations at all times. This problem may become particularly acute when applied to ad-hoc networks including a very large number of nodes. Other difficulties which may be faced when implementing cluster/spine approaches are how to efficiently associate nodes with clusters and designate cluster leader nodes for each cluster.

SUMMARY OF THE INVENTION

In view of the foregoing background, it is therefore an object of the present invention to provide a mobile ad-hoc network and related methods which provide for an efficient establishment of routes as well as cluster organization within the network.

This and other objects, features, and advantages in accordance with the present invention are provided by a method for communicating between a source node and a destination node in a mobile ad-hoc network including a plurality of intermediate nodes between the source node and the destination node. The method may include transmitting a quality-of-service (QoS) route request from the source node to the destination node via the plurality of intermediate nodes to discover routing to the destination node based upon a plurality of QoS parameters. Responsive to the QoS route request, a plurality of potential routes between the source node and the destination node may be determined along with a QoS metric corresponding to each of the QoS parameters for each potential route. Further, the QoS parameters may be ranked in an order of importance, and each of the QoS metrics weighted based upon the ranking of QoS parameters. As such, the weighted QoS metrics may be compared and one of the potential routes may be selected based thereon. In addition, message data may be transmitted from the source node to the destination node via the selected route.

It should be noted that the route request used in the above manner with link and node metrics may be used to perform route discovery for QoS paths for a reactive routing protocol. A similar approach may also be used with a proactive routing protocol to discover the best route and reserve resources among the currently known proactive routes.

Accordingly, the present invention thus provides a flexible an efficient method for selecting a route for communication between the source and destination nodes based upon multiple QoS parameters. Thus, performance may be enhanced across numerous applications and operating environments by more heavily weighting QoS parameters having the most significant importance in a given application, for example.

More particularly, the method may further include generating a weighted sum of the QoS metrics for each potential route and the weighted sums compared to select the appropriate route. The QoS metrics may include QoS link metrics and/or QoS node metrics. By way of example, the QoS link metrics may include at least one of available bandwidth, error rate, end-to-end delay, end-to-end delay variation, hop count, expected path durability, priority, unidirectionality or bidirectionality, and link capacity. Also, the QoS node metrics may include at least one of battery life, mobility, communications capacity, and position, for example.

Furthermore, determining the plurality of potential routes may include, at each intermediate node, determining whether the node can support the requested QoS parameter of the QoS route request and, if so, forwarding the QoS route request to one of other intermediate nodes and the destination node. Node resources may thus be temporarily reserved for QoS route requests having supportable QoS parameters to define a path of travel. As such, determining the plurality of potential routes may further include, at the destination node, generating a reply to the source node upon receiving the QoS route request and sending the reply along the path of travel.

The method may also include transmitting route confirmations to the intermediate nodes on the selected route prior to transmitting message data. In addition, at each of the intermediate nodes and the destination node, it may be detected whether the node can continue to support the requested QoS parameter of the QoS route request and, if not, generating and sending a QoS error notification to the source node. To provide a backup in such events, for example, at least one standby route may be selected at the source node.

Additionally, the method may also include grouping the nodes into a source cluster including the source node, a destination cluster including the destination cluster, and at least one intermediate cluster therebetween including intermediate nodes. Further, an adjacent cluster target node may be established in the at least one intermediate cluster for providing a point of access therefor, where each potential route includes the adjacent cluster target node.

Moreover, the adjacent cluster target node may similarly be established by determining target routes between the source node and a plurality of potential target nodes in the at least one intermediate cluster and a QoS target metric corresponding to each of a plurality of QoS target parameters for each target route, and ranking the QoS target parameters in a target order of importance. Further, each of the QoS target metrics may be weighted based upon the ranking of QoS target parameters. The weighted QoS target metrics may thus be compared, and the adjacent cluster target node selected based thereon. Again, this approach provides for greater flexibility in selecting the adjacent cluster target nodes as well as greater efficiencies from weighting based upon more significant QoS parameters in a given situation.

More particularly, the method may also include generating a weighted sum of the QoS target metrics for each potential route, and the weighted sums of the target metrics may be compared for selecting the adjacent cluster target node. In addition, the QoS target metrics may also include at least one of available bandwidth, error rate, end-to-end delay, end-to-end delay variation, hop count, expected path durability, priority, unidirectionality or bidirectionality, and link capacity, for example.

Another related method aspect of the invention is for organizing nodes in a mobile ad-hoc network including a plurality of nodes. The method may include grouping the plurality of nodes into clusters, and determining quality of service (QoS) node metrics for each node in each cluster, where each QoS node metric corresponding to a QoS node parameter. Furthermore, the QoS node parameters may be ranked in a node order of importance, and each of the QoS node metrics may be weighted based upon the ranking of QoS node parameters. The weighted QoS node metrics for each node in a given cluster may thus be compared with one another, and a given cluster leader node may be selected for the given cluster based thereon. This method aspect therefore similarly provides a flexible an efficient process for selecting cluster leader nodes in clustered mobile ad-hoc networks using multiple QoS parameters.

Likewise, the method may also include providing an additional node to be included in the mobile ad-hoc network, establishing a route from the additional node to at least one node in each of the clusters, and determining QoS link metrics for each route. Each QoS link metric preferably corresponds to a QoS link parameter. Also, the QoS link parameters may be ranked in a link order of importance, each of the QoS link metrics may be weighted based upon the ranking of QoS link parameters, and the weighted QoS link metrics may be compared. The additional node may be associated with one of the clusters based upon the comparison.

The QoS link metrics may include at least one of available bandwidth, error rate, end-to-end delay, end-to-end delay variation, hop count, expected path durability, priority, unidirectionality or bidirectionality, and link capacity. The method may further include generating a weighted sum of the QoS link metrics for each route, and comparing the weighted QoS link metrics may include comparing the weighted sums of the QoS link metrics.

The method may also include generating a weighted sum of the QoS node metrics for each node, and comparing may include comparing the weighted sums for each node in the given cluster with one another. By way of example, the QoS node metrics may include at least one of battery life, mobility, communications capacity, and position.

BRIEF DESCRIPTION OF THE DRAWINGS

FIG. 11 is a flowchart illustrating a method aspect of the invention for associating nodes with respective clusters based upon a weighted average of QoS metrics in accordance with the present invention.

FIG. 12 is a flowchart illustrating a method aspect of the invention for selecting cluster leader nodes based upon a weighted average of QoS metrics in accordance with the present invention.

DETAILED DESCRIPTION OF THE PREFERRED EMBODIMENTS

Figure 1:
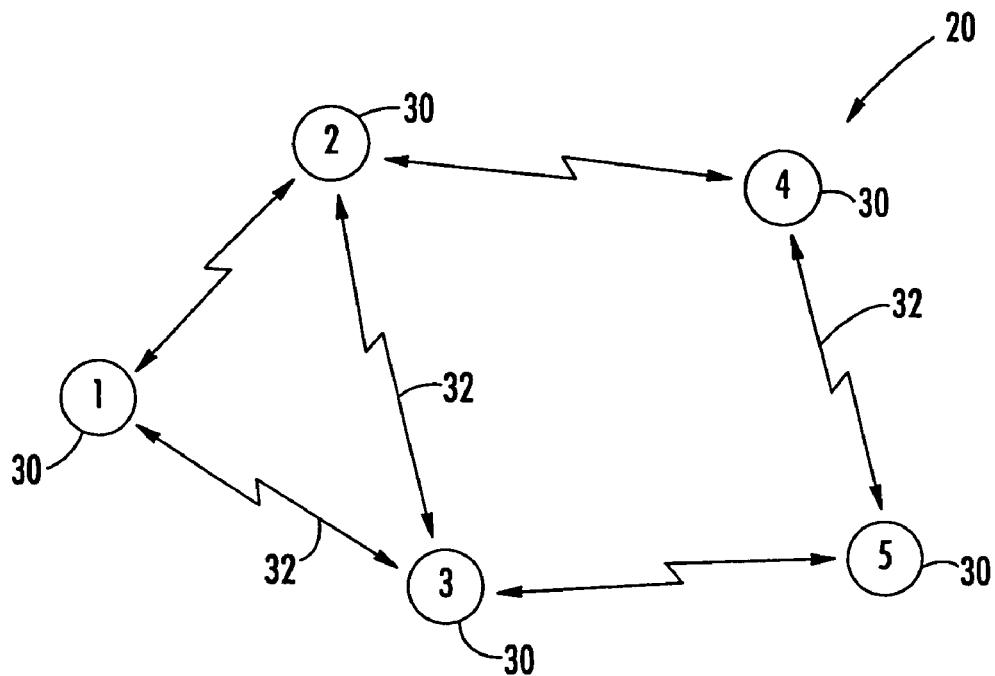
FIGS. 1-4 are schematic diagrams of a mobile ad-hoc network including QoS routing in accordance with the present invention.
Figure 2:
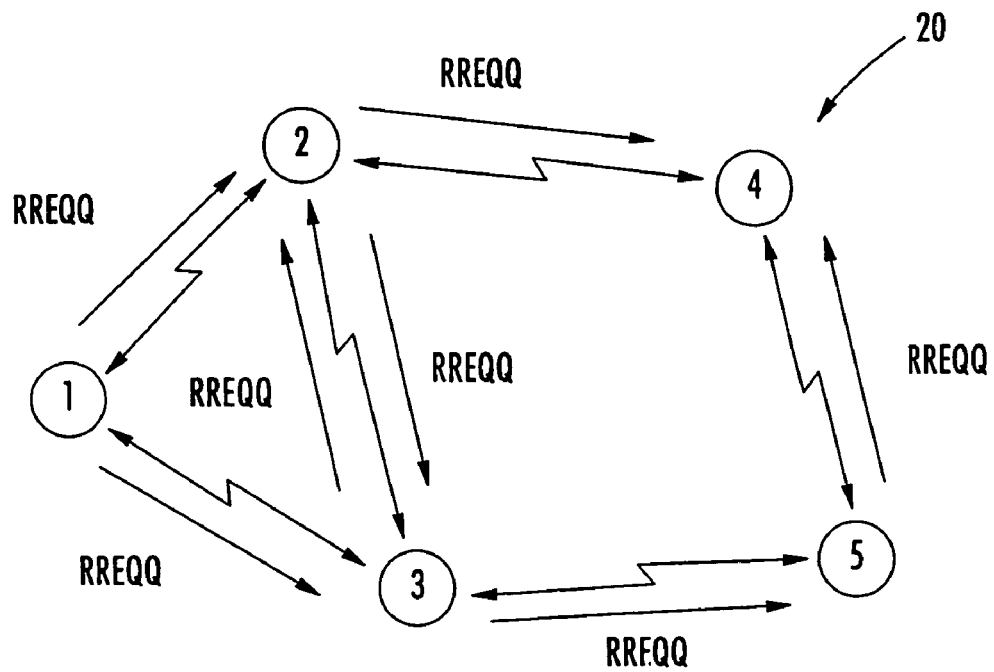
Figure 3:
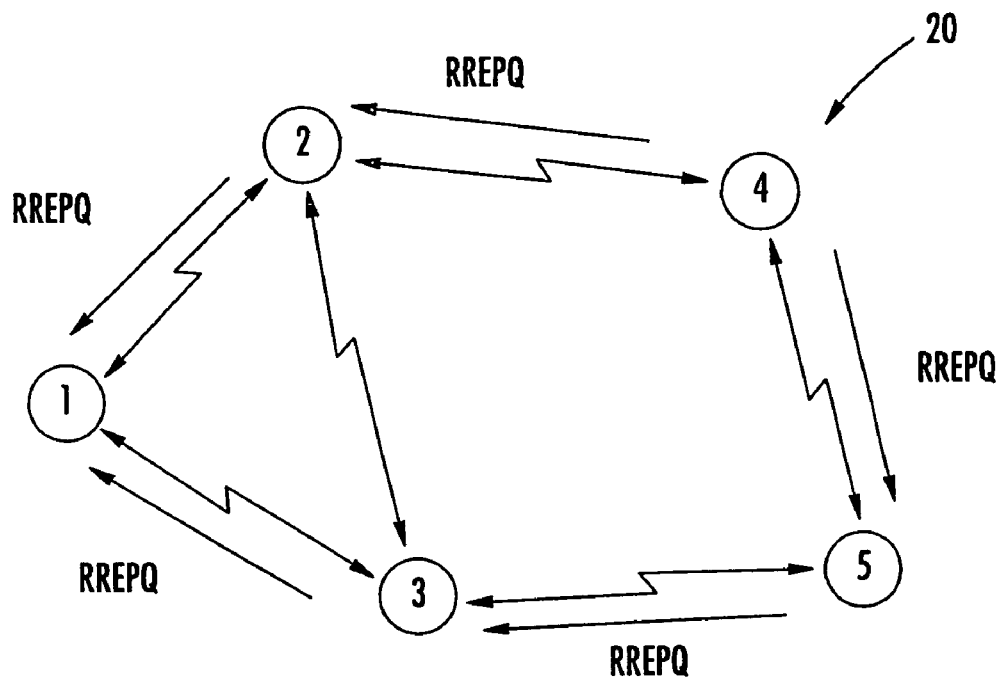
Figure 4:
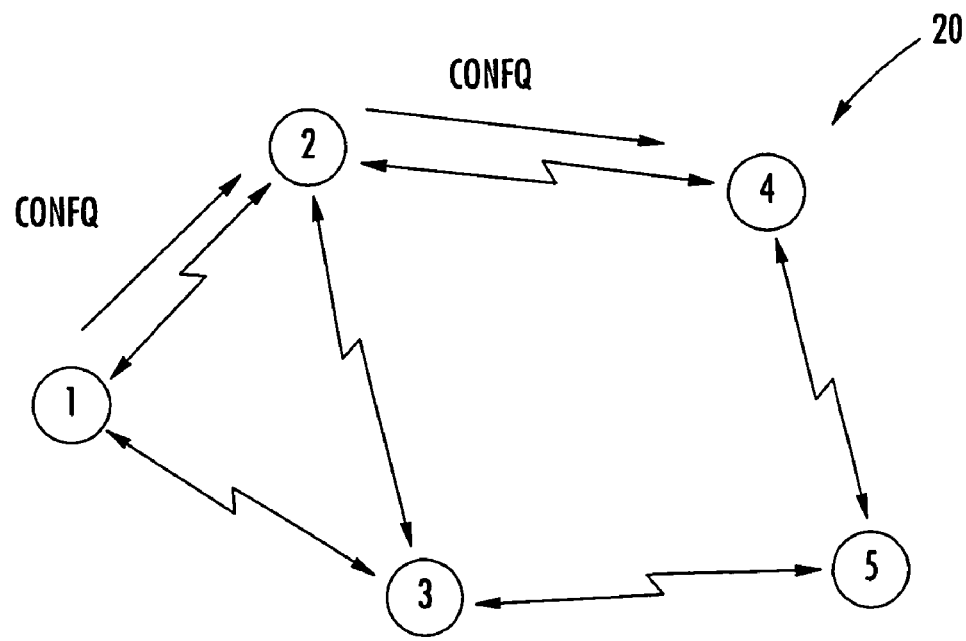
Figure 5:
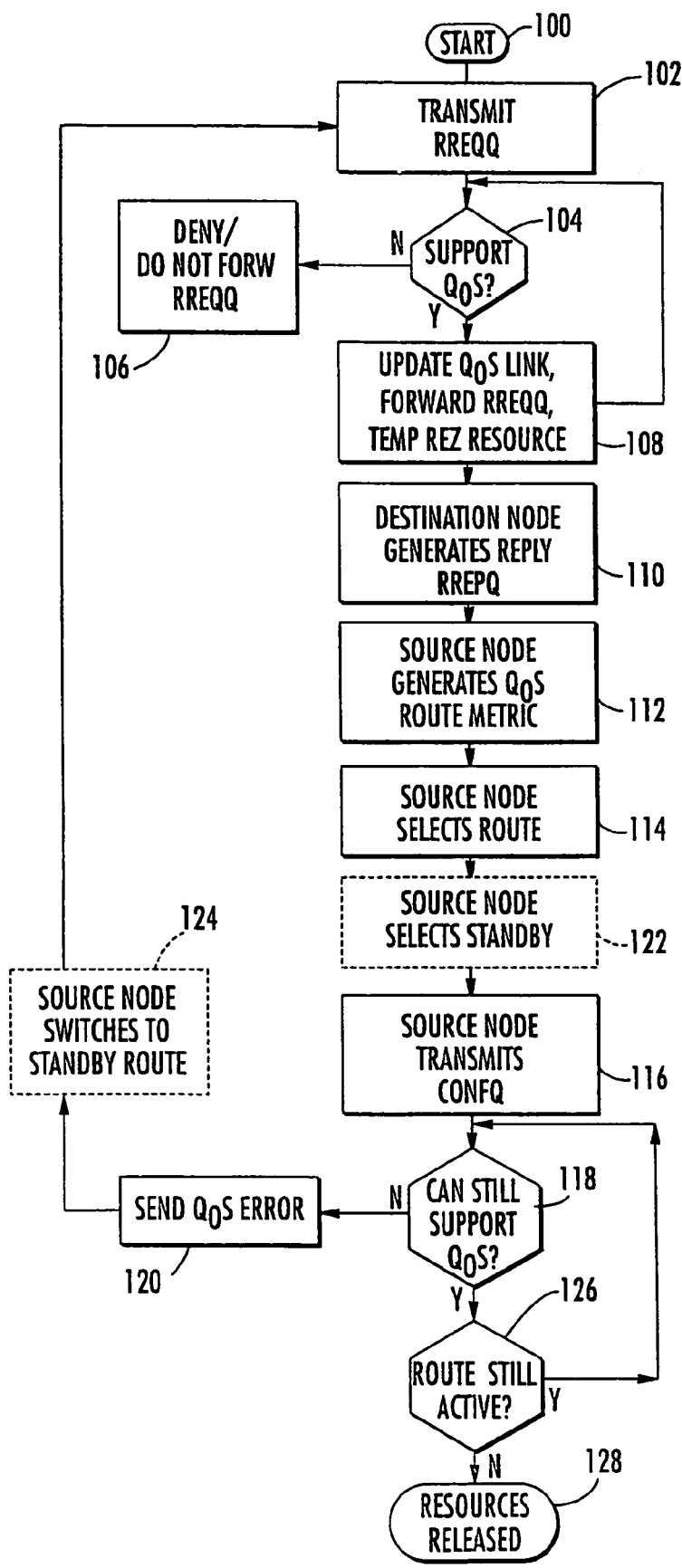
FIG. 5 is a flowchart illustrating the method steps for QoS routing in a mobile ad-hoc network in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As will be appreciated by those skilled in the art, portions of the present invention may be embodied as a method, data processing system, or computer program product. Accordingly, these portions of the present invention may take the form of an entirely hardware embodiment, an entirely software embodiment, or an embodiment combining software and hardware aspects. Furthermore, portions of the present invention may be a computer program product on a computer-usable storage medium having computer readable program code on the medium. Any suitable computer readable medium may be utilized including, but not limited to, static and dynamic storage devices, hard disks, optical storage devices, and magnetic storage devices.

The present invention is described below with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Referring initially to FIGS. 1-5, a method for determining a route from a source node to a destination node in a mobile ad-hoc network 20 will now be described. The network 20 includes a plurality of mobile nodes 30 including the source node 1 and the destination node 4 with intermediate nodes 2, 3 and 5 therebetween. The nodes 30, such as laptop computers, personal digital assistants (PDAs) or mobile phones, are connected by wireless communication links 32 as would be appreciated by the skilled artisan. The method begins (Block 100) and includes transmitting a quality-of-service (QoS) route request RREQQ from the source node 1 to discover routing to the destination node 4 based upon a QoS parameter, as indicated at Block 102 in FIG. 5. The QoS parameter is preferably based upon available bandwidth, error rate, end-to-end delay, end-to-end delay variation, hop count, expected path durability, and/or priority as will be discussed in further detail below. Other QoS metrics will be discussed further below. The route request RREQQ includes a QOS flow identifier and an updatable QoS link metric.

Furthermore, at Block 104, the method includes each intermediate node 2, 3 and 5 determining whether the node can support the requested QoS parameter of the QoS route request RREQQ. If the node cannot support the QoS parameter of a particular request RREQQ, then the request is denied or simply not forwarded by the node (Block 106). If the node, for example node 3, can support the QoS parameter of a particular request RREQQ, then the node updates the QoS link metric, forwards the QoS route request to other intermediate nodes 2 and 5, and temporarily reserves node resources for that QoS route request (Block 108). Intermediate nodes 2 and 5 also must determine whether they can support the requested QoS parameter of the QoS route request RREQQ forwarded from node 3. If so, the route request RREQQ with the updated QoS link metric is then forwarded to the destination node 4.

The destination node 4, upon receiving the QoS route request RREQQ, generates a reply RREPQ to the source node 1 including the flow identifier and updated QoS link metric for each discovered route (Block 110). In other words, the destination node 4 may have received the forwarded route request RREQQ from any of various possible routes including, for example, 1-2-4 or 1-3-5-4. A reply RREPQ is generated in each case. At Block 112, the source node 1 generates QoS route metrics based upon updated QoS link metrics in replies RREPQ from the destination node 4 for discovered routes. Also, at Block 114, the source node 1 then selects a route to the destination node 4 based upon the QoS route metrics.

Figure 6:
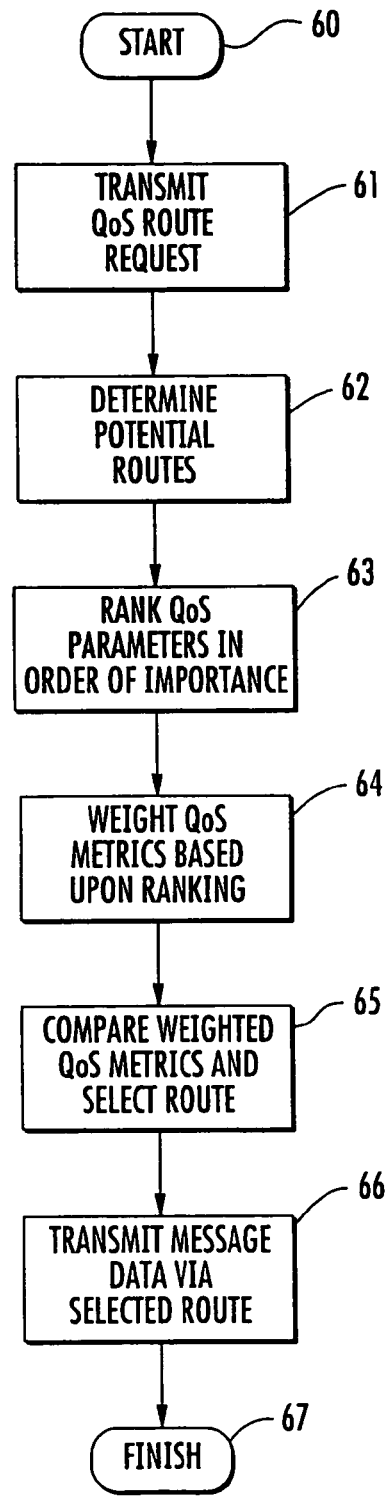
FIG. 6 is a flowchart illustrating a method aspect of the invention for selecting routes based upon a weighted average of QoS metrics in accordance with the present invention.

More particularly, in some embodiments the route to the destination node 4 may be selected using a weighted average of a plurality of QoS route metrics. Such an embodiment will now be described with reference to FIG. 6. The method illustrated in FIG. 6 provides for communication between the source node 1 and the destination node 4 in the mobile ad-hoc network 20. The method begins (Block 60) with transmitting a QoS route request from the source node 1 to the destination node 4 via the plurality of intermediate nodes 2, 3, 5 to discover routing to the destination node based upon a plurality of QoS parameters, as previously described above. Responsive to the QoS route request, a plurality of potential routes between the source node 1 and the destination node 4 may be determined along with a QoS metric corresponding to each of the QoS parameters for each potential route, at Block 62, and as similarly discussed above.

It should be noted that metric collection may be performed in various ways. For example, this may be done by collecting the entire metric vector at the source node 1 using a DSR-type algorithm or a link state algorithm, as will be appreciated by those of skill in the art. Further, metric collection may be performed by incrementally calculating path vectors by adding contributions at intermediate nodes. The latter approach may place more limitations on the form of the overall path and network metric that can be supported, which may or may not be desirable in some applications. Of course, those of skill in the art will appreciate that the present invention may be implemented using numerous mobile ad-hoc routing protocols, including both the reactive and proactive prior art protocols described above. Again, the discussion seems to be restricted to reactive routing. Can also apply the technique to proactive protocols by restricting broadcast to those existing known proactive routes.

In accordance with this aspect of the invention, the QoS parameters may be ranked in an order of importance, at Block 63. This ranking is preferably done prior to network deployment based on a determination of network performance objectives, as will be appreciated by those skilled in the art. The ranking will lead to a determination of the weighting factors which will be preconfigured for each node or set via network management. During the actual node operation, the node does not need to know the ranking. Rather, it only needs to know the weighting. Exemplary rankings for various mobile ad-hoc network functions are provided in Table 1, below.

TABLE 1

Exemplary QoS Rankings

| Link or Node Metric | QoS Bandwidth Path | QoS Delay Path | Best Effort Path | Cluster Join | CLN Node Election | ACTN Node Selection |
|---|---|---|---|---|---|---|
| Estimated Link Delay | 2 | 1 | 2 | | | 2 |
| Estimated Link Delay Variance | 3 | 2 | | | | 3 |
| Effective Number of Transmissions | 4 | 3 | | 2 | | 4 |
| Link Capacity | | | | 3 | | |
| Available Link Capacity | 1 | | 1 | | | 1 |
| Hop Count | | | | | | |
| Bidirectionality | 5 | 4 | 3 | 1 | | 5 |
| Link Reliability | | | | | | |
| Expected Link Durability | | | | | | |
| Node & Battery Life | | | | | 1 | |
| Node and Communications Mobility and Durability | | | | | 2 | |
| Node Communications Capacity | | | | | 3 | |
| Node Position Relative to Other Important Network Nodes | | | | | | |
| Aggregate Distance to Area Member Nodes | | | | | 4 | |
| Distance to Neighbor ALN Nodes | | | | | 5 | |

As may be seen in Table 1, in the case of route selection various rankings may be used depending upon the types of routes desired. For example, the column labeled "QoS Bandwidth Path" provides a ranking of five QoS parameters that would be most significant to obtain routes having maximum bandwidth, where 1 indicates the most significant parameter and 5 the least significant. Similarly, the columns labeled "QoS Delay Path" and "Best Effort Path" respectively provide rankings for selecting routes with a least amount of delay or having the best probability of message data delivery using a best efforts approach. Of course, it will be appreciated by those of skill in the art that different rankings may be used for particular applications, and that other route discovery functions may be similarly ranked in accordance with the present invention. It will also be appreciated that the ranking step illustrated at Block 63 need not be performed in the order illustratively shown (e.g., it may done beforehand).

Based upon the ranking of the QoS parameters used in the given application, each of the QoS metrics may be weighted by the source node 1 based upon the ranking, at Block 64. Preferably, the assignment of the appropriate values to the components of the weight vector w is done prior to operation based on the metric rankings, as described earlier. The actual metric weighting is preferably done during operation in "real time" as is shown in the equations presented and discussed below. As such, the weighted QoS metrics may be compared, and one of the potential routes may be selected based thereon, at Block 65. Once the route is selected, message data may be transmitted from the source node 1 to the destination node 4 via the selected route, at Block 66, thus concluding the method (Block 67). As used herein, "message data" is intended to include any data that may be sent between nodes in a mobile ad-hoc network during operation, including (but not limited to) additional route requests/replies, video data, audio data, alphanumeric data, etc.

Depending upon the particular embodiment, the QoS metrics may advantageously include QoS link metrics and/or QoS node metrics. More specifically, the QoS link metrics may include at least one of available bandwidth, error rate, end-to-end delay, end-to-end delay variation, hop count, expected path durability, priority, unidirectionality or bidirectionality, and link capacity, for example. The QoS node metrics may include at least one of battery life, mobility, communications capacity, and position, for example. Further examples of QoS node/link metrics are provided in Table 1, and other QoS node/link metrics known to those of skill in the art may, of course, also be used.

The above noted weighting of QoS link/node metrics will now be described with respect to two specific examples. Generally speaking, in the case of route selection, a weighted sum of the QoS metrics is preferably generated for each potential route, for example. The weighted sum for each potential route may then be compared with the weighted sums of the remaining potential routes, and the final route selected based upon this comparison. The following terminology and definitions are provided prior to discussing the specific examples to aid in the understanding thereof.

For the following examples, link metric vectors $m_L$ and node metric vectors $m_N$, are defined, each of which is an important characteristic in evaluating routes to meet various QoS needs in network organization. Further, a node metric form is given by $m_N=(C_{N1}, C_{N2}, C_{N3}, \ldots )$, where $C_{Ni}$ is the $i^{th}$ component of the node metric vector, and a link metric form is given by $m_L=(C_{L1}, C_{L2}, C_{L3}, \ldots )$, where $C_{Li}$ is the $i^{th}$ component of the link metric vector. As will be appreciated by those of skill in the art, link and node metric vectors can be passed over the network 20 in network control packets, for example.

A raw path metric for a route from a source node 1 to destination node k+1 can be represented as the vector of node and link metric vectors $m_P=(m_{L1}, m_{N2}, m_{L2}, \ldots, m_{L(k-1)}, m_{Nk}, m_{Lk})$ along the path or potential route. As noted above, the metric components that are key in a given application are ranked, and then the link $w_L$ and node $w_N$ metric weighting vectors may be defined. These metric vectors may include both zero and nonzero components to provide the desired emphasis in a given application, as will be appreciated by those of skill in the art. A final path metric may be a scalar evaluated as function of the raw path metric vector and the node and link weighting vectors, which is given by $M_P=F(w_N, w_L, m_P)$. Paths or routes are preferably selected based upon the best value of the final path metric $M_P$, and the form of the function F( ) used to be used will of course depend upon the particular application (e.g., QoS delay path, QoS capacity allocation, best effort, etc.).

A first QoS delay-sensitive path metric example will now be described. Here, the first path metric equation provided below uses components for hop count (weight of 1), bidirectionality (BD=0 for a bidirectional link and BD=1 for a unidirectional link with weight $K_3$), estimated link delay (with weight $K_1$), and inverse link capacity (with weight $K_2$). In this example, the best path will result in the minimum path metric. Parameters for these weight parameters are preferably specified in advance via preconfiguration based on operational performance characteristics. The first path metric equation is as follows:

$$\text{Path\_met} = \sum_{\text{all\_links}} \left[ 1 + K_1 \cdot D_{Li} + \frac{K_2}{C_{Li}} + K_3 \cdot BD_{Li} \right]$$

The second example for determining routes using weighted QoS metrics is for the case when QOS guaranteed capacity allocation for a flow allocation need of $C_{req}$ is required. The second path metric example equation below includes components for available link capacity $C_A$, (with a weight of 1), estimated link delay (with weight $K_1$), estimated delay standard deviation (with weight $K_2$), estimated number of transmissions per packet per link (with weight $K_3$), and bidirectionality (with weight $K_4$). Here again, the best path will have the minimum path metric. The second path metric equation is as follows:

$$\text{Path\_met} = \sum_{\text{all\_links}} \left[ \frac{1}{(C_{ALi} - C_{req})} + K_1 \cdot D_{Li} + K_2 \cdot \sigma_{Li} + K_3 \cdot N_{Li} + K_4 \cdot BD_{Li} \right]$$

Figure 7:
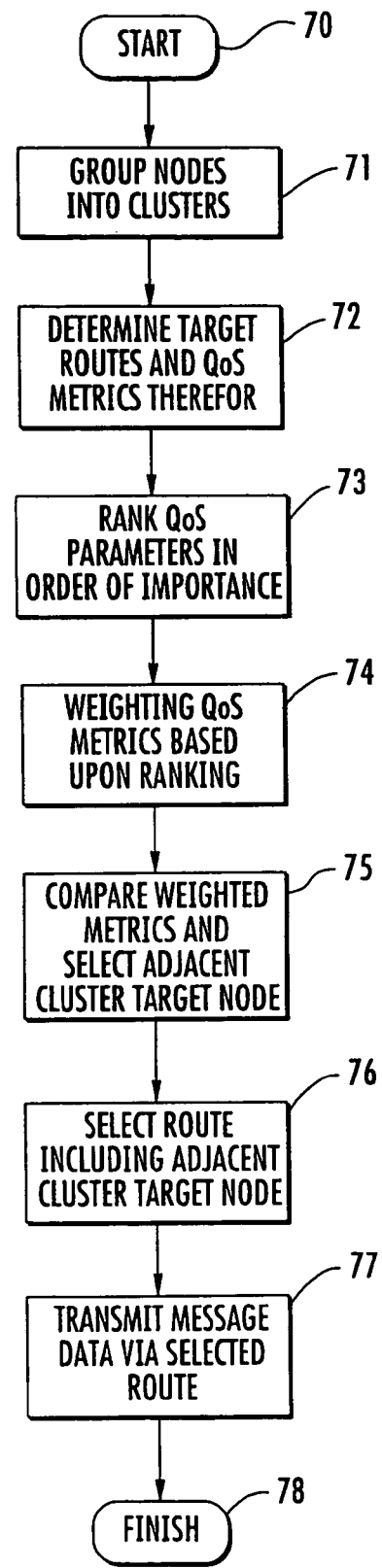
FIG. 7 is a flowchart illustrating a method aspect of the invention for selecting adjacent cluster target nodes based upon a weighted average of QoS metrics in accordance with the present invention.
Figure 8:
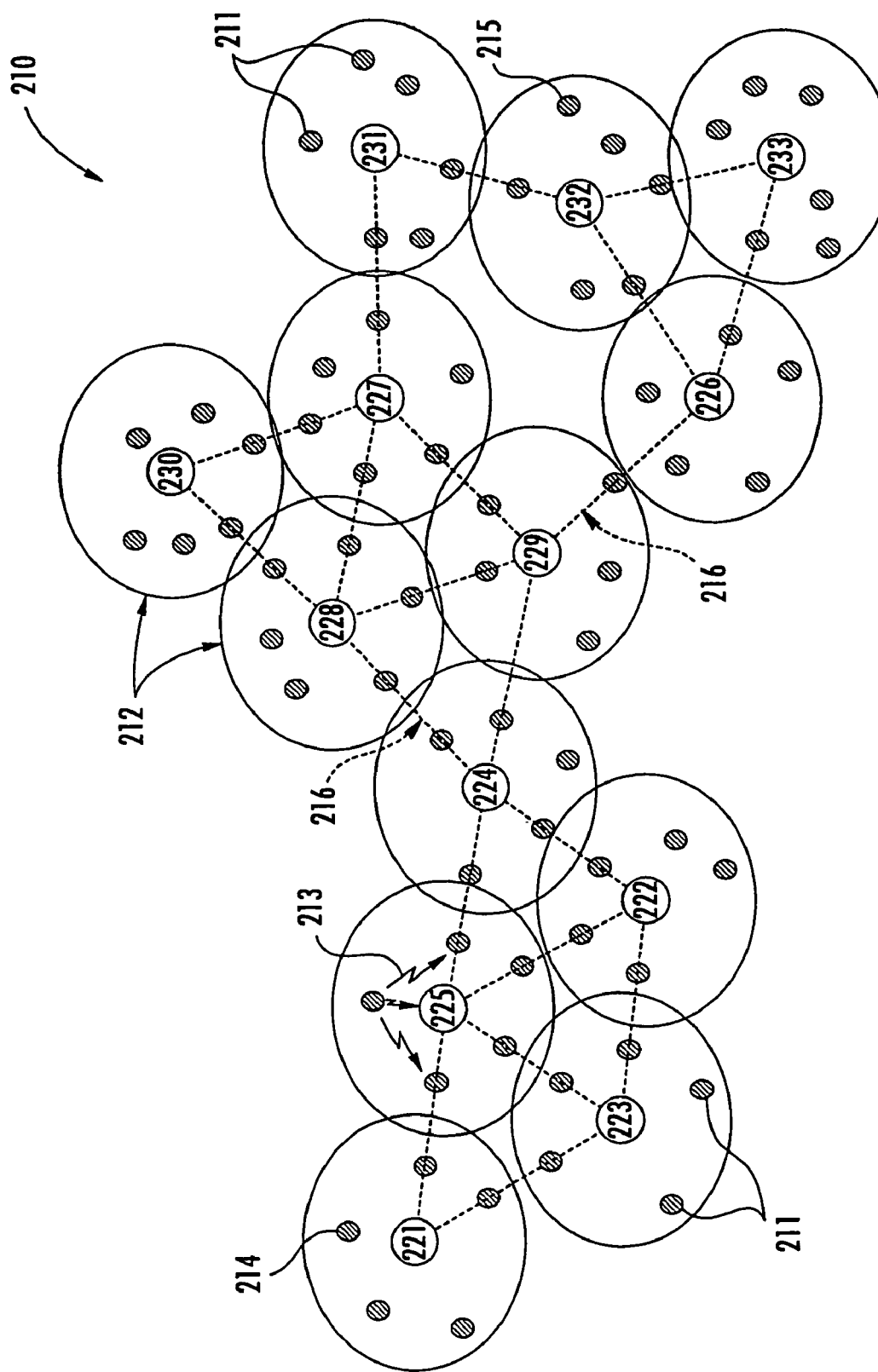
FIG. 8 is a schematic diagram of an ad-hoc network according to the present invention.
Figure 9:
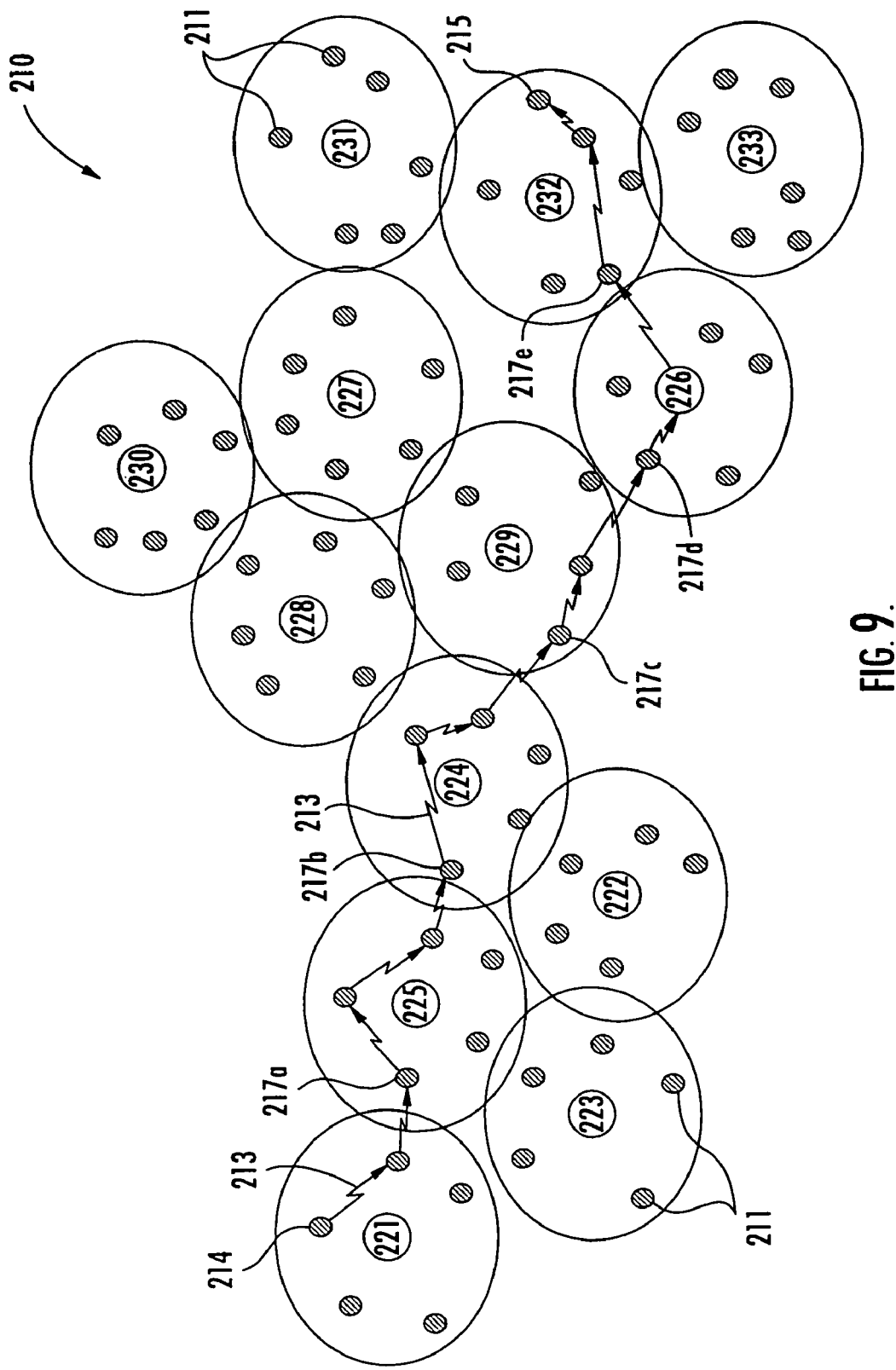
FIG. 9 is a schematic diagram of the ad-hoc network of FIG. 8 illustrating a selected route between the source node and the destination node thereof.

Another aspect of the above method will now be described with reference to FIGS. 7-9. The exemplary mobile ad-hoc network 210 illustrated in FIGS. 8 and 9 illustratively includes a plurality of nodes 211 connected by wireless communications links 213. The nodes 211 may be any suitable type of wireless communications device capable of communicating within a wireless ad-hoc network, such as computers, personal data assistants (PDAs), etc. with wireless modems, as well as others, as will be appreciated by those of skill in the art. Of course, it will also be appreciated that certain of the nodes 211 may optionally be connected to a fixed communications infrastructure in some embodiments, if desired.

The nodes 211 are preferably grouped into clusters 212, which are illustratively shown as circles surrounding respective groups of nodes in FIGS. 8 and 9. Grouping of the nodes 211 into clusters 212 will be described in greater detail below. For each of the clusters 212, one of the nodes 211 thereof is designated as a respective cluster leader node 221-233. The process for designating the cluster leader nodes 221-233 and the function thereof will also be described further below. For clarity of explanation, when a cluster 212 is discussed individually herein, the particular cluster will be referred to by the reference numeral of its respective cluster leader node. For example, the cluster leader node 221 is within the cluster 221, etc.

In accordance with this method aspect of the invention, the method begins (Block 70) by grouping the nodes into clusters (Block 71), as noted above. Thereafter, an adjacent cluster target node (e.g., 217a) may be established in at least one intermediate cluster (e.g., the cluster 225) for providing a point of access therefor to allow routing through the cluster, as will be explained in greater detail below. This may advantageously be done by determining target routes between the source node 214 and a plurality of potential target nodes in the intermediate cluster 225, at Block 72, as will also be described in greater detail below. As similarly described above, selection between the various potential target nodes in the cluster 225 may here again be based upon weighted QoS metrics. That is, a QoS target metric is preferably also determined corresponding to each of a plurality of desired QoS target parameters for each target route (Block 72).

Furthermore, the QoS target parameters may again be ranked in a target order of importance, at Block 73, as previously described above. In particular, Table 1 includes an exemplary ranking for adjacent cluster target node designation in the column labeled "ACTN Node Selection." Of course, other QoS parameters and ranking orders may be used in various applications, as will be appreciated by those of skill in the art.

Each of the QoS target metrics is then weighted based upon the ranking of QoS target parameters (Block 74) as previously described above, and the weighted QoS target metrics may thus be compared so that the adjacent cluster target node (the node 217a in the present example) can be selected based thereon, at Block 75. Here again, a weighted sum of the QoS target metrics is generated for each potential route using the appropriate equation, similar to as the first and second equations noted above, and the weighted sums of the target metrics may be compared for selecting the adjacent cluster target node 217a. The best route between the source node 214 and the destination node 215 is then selected (Block 76) which will be through the intermediate cluster 225 and include the adjacent cluster target node 217a.

Of course, those skilled in the art will appreciate that numerous intermediate clusters may be between the source cluster 221 and destination cluster 232, as is illustratively shown in FIGS. 8 and 9, for example. While only selection of the adjacent cluster leader node 217a has been described for clarity of explanation, it will be appreciated that the same approach may be used for determining subsequent adjacent cluster target nodes 217b-217d along the final route illustrated in FIG. 9. Thus, message data may then be transmitted from the source node 214 to the destination node 215 via the selected route through the intermediate cluster 225 (and the intermediate clusters 224, 229, 226, and 232 in the illustrated example), at Block 77, thus concluding the method (Block 78). It should also be noted that the target metrics used for this approach may include the link and/or node metrics previously discussed above, for example.

Referring once again to FIG. 5, at Block 116, the source node 1 transmits route confirmations CONFQ to intermediate nodes on the selected route. This is to confirm the use of the resources on the selected route that were temporarily reserved at Block 108. Other temporarily reserved resources on discovered but non-selected routes may be permitted to time out by not transmitting CONFQ on those routes.

Also, the source node 1 may select at least one standby route either with or without sending confirmations CONFQ to the intermediate nodes on the standby route (Block 122). Such a standby route may be for duplicate transmissions, for additional reliability, or may be used as a backup route in case of route and/or QoS failure. At Block 118, the intermediate nodes 2, 3 and 5, and/or the destination node 4, may detect at any time whether the node can continue to support the requested QoS parameter of the QoS route request RREQQ. If the node can continue to support the request RREQQ throughout propagation of the traffic, reserved resources and associated routes may be permitted to time out if determined inactive, at Block 126, and be released, Block 128, if not used for a period of time either by data traffic or by the sending of periodic CONFQ messages.

If the node cannot continue to support the request RREQQ, then the node generates a QoS error notification RERRQ to the source node 1 (Block 120). Here, the source node 1 may maintain the selected route, upon receiving the QoS error notification RERRQ, while again transmitting a quality-of-service (QoS) route request RREQQ to discover a new routing path to the destination node 4 based upon the QoS parameter (Block 102). The source node 1 may also switch to the standby route upon receiving the QoS error notification RERRQ (Block 124).

Again, it should be noted that the above described method aspects of the invention can be applied to any type of On-Demand or Reactive routing protocol, such as Dynamic Source Routing (DSR) or Ad-Hoc On-Demand Distance Vector (AODV) routing, or to any hybrid proactive/reactive protocol, such as Zone Routing Protocol (ZRP), as would be appreciated by those skilled in the art.

A more specific example considering minimum bandwidth allocation and a maximum delay constraint as categories of QoS will now be described. For a fixed bandwidth allocation it is assumed that a node 30 is able to reserve a certain amount of capacity or bandwidth. Again, source node 1 of a traffic flow will send the QoS Route Request RREQQ for each required flow (the last Q in the notation indicates a QoS request). The RREQQ message performs the function of discovering a route that can support the required QoS. Nodes that forward the RREQQ to the destination 4 will note if they can meet the requested QoS before passing on the RREQQ and they will temporarily reserve resources if needed. A Route Reply RREPQ packet is returned from the destination with an indication that the requested QoS can be met over that path. The source node 1 may then collect multiple potential paths to the destination 4 before deciding upon the best choice to provide the desired QoS. Once this path is determined, a Confirm CONFQ message is sent to the destination 4 along the indicated path. Along the way on this path any temporary resource reservations are confirmed to be permanent reservations. QoS reservations are timed out if not used for a specified period of time. If a link fails along the route or if the QoS requirement cannot be met, a Route Error (RERRQ) packet is generated and returned to the source node.

More specifically, when a new QoS route is needed to a given destination node 4, the source node 1 broadcasts a RREQQ packet to the destination node. This is a special type of packet similar to the conventional RREQ packet used in a protocol such as DSR or AODV. The conventional RREQ broadcast is used for "best effort" service. The method of the present invention may still follow the conventional procedures established by the protocol for best effort service.

If a specified minimum capacity or bandwidth is required for a traffic flow, the special RREQQ packet is used to reserve a flow at a specified capacity to the destination 4. In this case, a flow ID is assigned to the RREQQ by the source node 1 which combined with the source node address uniquely identifies the flow to any node in the network 20 that is forwarding the flow. The RREQQ packet also indicates the capacity that is to be reserved.

At each node 2, 3 and 5 in the path to the destination 4, the minimum capacity or bandwidth requirement is checked against available capacity to determine if a reservation can be made for the flow. If the node can accommodate the required traffic flow, then the capacity is temporarily reserved for that flow ID. This temporary reservation is released if a CONFQ message is not received within a short period of time. If the RREQQ is meant to insure that a path can be found that does not exceed a specified maximum delay, then each node along the path must be able to estimate its contribution to the total path delay and check to see if the total delay along the path so far plus its contribution exceeds the specified maximum delay bound.

Unlike conventional application of DSR and AODV for "best effort" traffic, the RREQQ must be allowed to propagate all the way to the destination node 4 to determine if a valid path exists that satisfies the QoS requirement. If such a path is found, then the destination node 4 generates a RREPQ message to be returned to the source node 1. This message indicates to the source node that a valid path has been found to the destination node 4 that satisfies the requested QoS and a route has been established (in the case of DSR a source route is returned). Estimated path delay is included in the RREPQ for a request seeking a delay guarantee as well as for a path guaranteeing capacity.

The source node 1 may receive multiple RREPQ for paths to the destination node 4 that can meet the required QoS. It will rank order these and send out a CONFQ message indicating its selection of a path on the highest ranked path. The other paths may be kept as backup paths, but if the CONFQ is not sent on these paths, there is no guarantee that the required resources will be available if needed as a backup alternate path.

If at any intermediate node 2, 3 and 5 or the destination node 4, the requested QoS is violated and cannot be satisfied, then the RREQQ packet is discarded knowing that the path through this node cannot satisfy the requested QoS. However, other paths may be found by the discovery process. If at any time a link fails along the route or if the QoS requirement cannot be met, a Route Error RERRQ packet is generated and returned to the source node 1 for each traffic flow affected by the failure. In this case either a backup path must be used or the route discovery process is initiated again.

The described procedures are easily applied to the DSR protocol. The conventional DSR message types RREQ, RREP, RRER are defined as optional packet types, and can be used as defined for the conventional operation of the protocol to support "best effort" traffic in a backwards compatibility mode. New optional packet types are defined to support QoS including the RREQQ, RREPQ, RRERQ, and CONFQ packet types to be used for managing QoS paths. Definition of the required header fields for these types is straightforward based on the functions defined above. A special type of QoS source routed packet for QoS mission data would also be included. This packet would include the flow ID to identify which flow the packet belonged and to allow for metering of flow traffic.

The following procedures would be used if a failure causes a node to issue a RERRQ packet. If a RERRQ packet is received at the source node, then the current route is discarded and a backup route is tried. The first packet sent on the backup route will be another type of special QoS source routed packet, the RREQT, that includes the flow ID and the QoS parameters. This packet could also include mission data. Each node along the path will have to check to see if they are still maintaining a temporary reservation for the flow. If not they will recheck to see if they can support the flow and make a temporary reservation. If the packet reaches the destination with the flow supported at each intermediate node, then the destination node will return a RREPQ packet notifying the source that the path is valid.

If any node cannot support the flow, then the packet is discarded and the node returns a RERRQ packet to the source node notifying it that the path cannot support the requested QoS parameters. If the source node receives a RREPQ packet, then it sends a CONFQ message along the selected path confirming the choice of path in addition to continuing to send the mission data for that traffic flow.

If the source node 1 receives a RERRQ packet, then it tries the same procedure on the next available backup path. If the source node has no more backup source routes to the destination, the source node begins another route discovery process for a new QoS path to the destination node. Data flow is interrupted until a new route is found. For any specific protocol, the data structures required to manage the resources allocated to each traffic flow can be defined, and how to identify the flows and how to look up the routes assigned to each flow can also be defined. Further details regarding routing selection based upon QoS parameters may be found in the above noted U.S. application Ser. No. 10/134,715.

Figure 10:
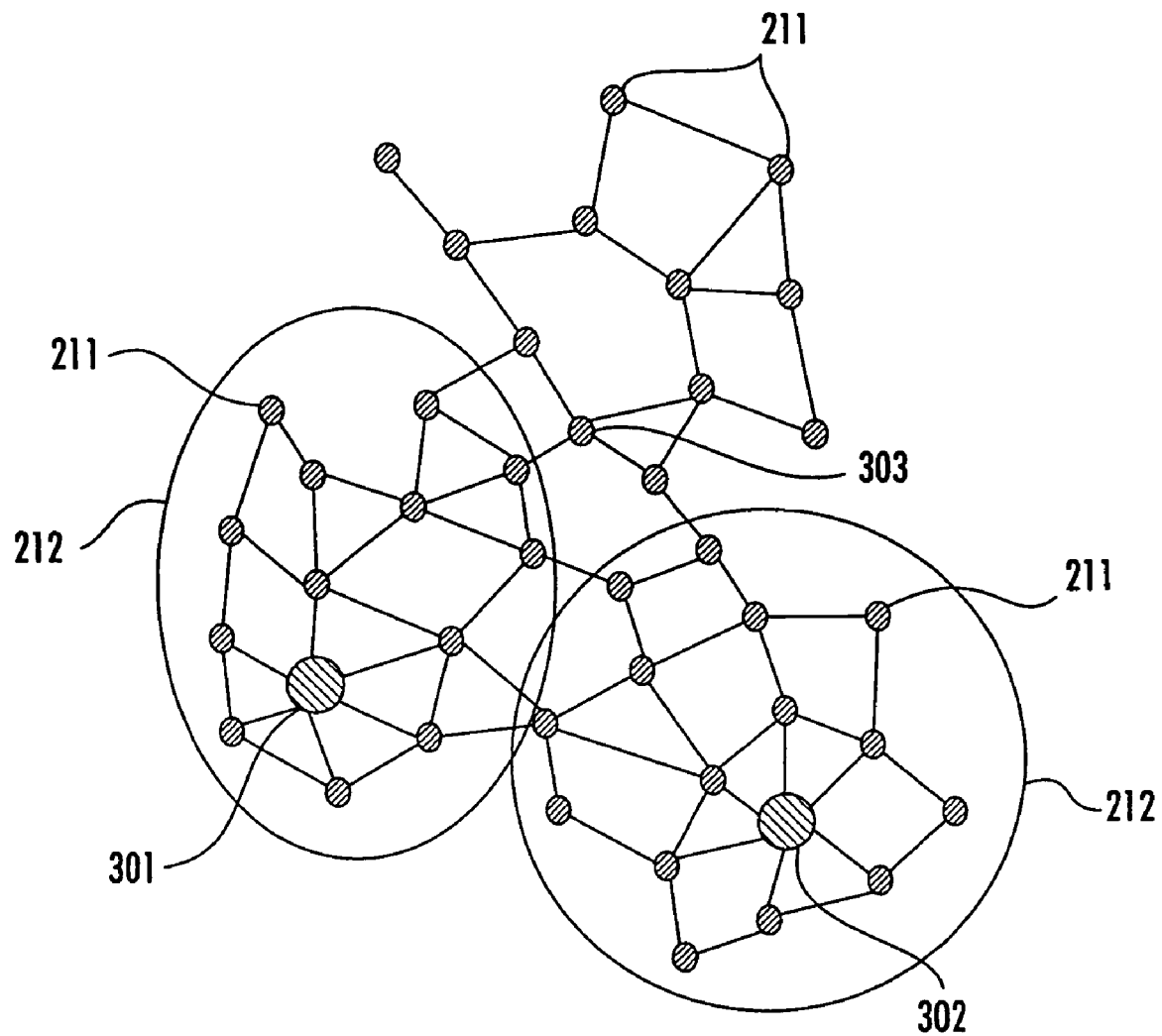
FIG. 10 is schematic diagram illustrating grouping of clusters and cluster leader node designation in accordance with the present invention.

Operational details of the above noted cluster association and election of cluster leader nodes will now be discussed further with reference to FIG. 10, in which a scenario for the election of a new cluster leader node is schematically illustrated. Clusters 301 and 302 include designated cluster leader nodes 301 and 202, respectively. Using the example illustrated in FIG. 10, operational details associated with node power-up election and cluster association will now be discussed.

Regarding node power-up and cluster association, upon powering up a node 303 may perform the following steps. The node 303 may "listen" for periodic cluster leader node announce (CLNANN) messages from cluster leader nodes in neighboring clusters (here, the cluster leader nodes 301 and 302) to identify potential clusters that it may join. Further, it may listen for the periodic HELLO messages from nodes 211 in the $k_N$-hop neighborhood to gather path metric information to all nodes in its $k_N$-hop neighborhood. Additionally, it may broadcast periodic HELLO messages to all nodes in its $k_N$-hop neighborhood. A cluster association metric $M_m^{CA}$ may then be formed for each adjacent cluster leader m and the cluster leader node m, may be selected with the minimum cluster association metric $M_m^{CA}$ as the cluster to join.

The metric $M_m^{CA}$ will preferably be less than a threshold $T_J$ to indicate that the node to be considered is close enough to the cluster to join. If this threshold is satisfied, then a cluster join message CLJOIN is sent to the cluster leader node m. If the cluster has less than the limit $L_{CL}$ on the number of nodes per cluster, then the cluster leader node accepts the node in the cluster and sends the acceptance message CLACCEPT to the node. If the cluster leader node cannot accept another member, then it sends a reject message CLREJECT to the node. Additionally, if the node is rejected, it may then select the next best cluster leader node as its backup and repeat the process to join that cluster. A node 303 following the above processes will ordinarily become a member of a cluster 212 soon after powering up, for example.

Yet another approach for associating the node 303 with a cluster will now be described with reference to FIG. 11. Continuing with the example illustrated in FIG. 10, this method aspect begins (Block 90) with grouping the nodes 211 into the clusters 212, as described above. When an additional node 303 is provided or presented to the network for association with a cluster 212 (e.g., upon power up thereof), at Block 82, routes are established from the additional node to at least one node in each of the clusters (here, the clusters 301 and 302), at Block 83, which may be done using the techniques described above. In some embodiments, the node to which the routes are established in the clusters 212 is the cluster leader node thereof. In other embodiments, this node may be the closest node in a cluster 212 to the additional node 303 in terms of hop count. Other nodes (or more than one node) may also be used in other embodiments, as will be appreciated by those of skill in the art.

The method further includes determining QoS link metrics for each route, at Block 84, which may be done as similarly described above with reference to FIG. 6. Here again, each QoS link metric corresponds to a QoS link parameter, such as those previously noted above. The QoS link parameters are also ranked in a link order of importance, at Block 85, again as was described above. One such exemplary ranking approach is provided in the column labeled "Cluster Join" in Table 1. Again, other QoS parameters and rankings may be used in various embodiments.

The QoS link metrics are weighted based upon the ranking of QoS link parameters (Block 86) as previously described above, and the weighted QoS link metrics compared to determine which cluster is best for the node 303 to associate with, at Block 87, thus concluding the method (Block 88). Once again, a weighted sum of the QoS link metrics may be generated for each route, and the weighted sums of the QoS link metrics compared to determine the best cluster 212 with which to associate.

Specific examples of equations which may be used for node association will now be presented. For this example, it will be assumed that the node 303 is deciding which cluster 301, 302 to join, and this node collects path metric information to nodes in the adjacent clusters thereto (here, the clusters 301, 302) to form an area metric, as previously described above. The following equations include the QoS parameters inverse link capacity (with weight 1), estimated number of transmissions per packet per link (with weight $K_1$), and bidirectionality (with weight $K_2$). Also, in this example a path metric to the adjacent cluster leader nodes 301, 302 is weighted greater than the others, and the cluster metric is normalized by the number of nodes in the cluster. The best cluster with which to associate will provide the minimum area metric using the following equations:

$$\text{Path\_met} = \sum_{\text{all\_links}} \left[ \frac{1}{C_{Li}} + K_1 \cdot N_{Li} + K_2 \cdot BD_{Li} \right]; \text{ and}$$

$$\text{Cluster\_met} = \frac{1}{\text{Num\_nodes\_in\_cluster}} \cdot \left[ \sum_{\text{all\_paths\_but\_CLN}} \text{Path\_met}_i + K_3 \cdot \text{Path\_met}_{ALN} \right]$$

In some cases, such as network initiation, for example, the node 303 will find no acceptable cluster leader node 221-233 with which to complete the association. In this case the node 211 may decide to contend to become a cluster leader node. If an ordinary node 303 decides to contend to become a cluster leader node, it may initiate the following procedures. The node 303 may broadcast a special type of CLNANN message to all nodes 211 in its $k_N$-hop neighborhood that announces its bid to become a cluster leader node, which includes the cluster leader metric calculated by the node. For reliability purposes, each node 211 in the $k_N$-hop neighborhood will preferably respond to the CLNANN message. Any node 211 that does not respond may be sent a follow-up CLNANN message via unicast, for example, as will be understood by those of skill in the art.

A node 211 responding positively to the CLNANN message returns a CLNANN message indicating agreement that the node 303 can become a cluster leader node. It does this either because it is not in a position to become a cluster leader node itself or it has a larger cluster leader metric than that received in the original CLNANN message. A node 211 responding negatively to the CLNANN message returns a CLNANN message that announces that it has a better cluster leader metric than that received in the original CLNANN message and that it will make a better cluster leader. In the event of a cluster leader metric tie, the cluster leadership role may be awarded to the node with the lowest node ID, for example, though other tiebreakers may also be used.

If all CLNANN message responses are positive, or if there is contention but the node 303 wins the cluster leader node role, then the node assumes the cluster leader node role. It then begins the periodic broadcast of regular CLNANN messages to be propagated for $n_{CL}$ hops to reach all nodes 211 in adjacent clusters 212 and the adjacent cluster leader nodes. Other nodes 211 may now begin to consider if they should join this new cluster. Yet, if another node wins, then the node 303 will consider if it should join the cluster of this new cluster leader node.

In accordance with the present invention, cluster leader node designation may also advantageously be performed using a weighted sum of QoS metrics. Referring more particularly to FIG. 12, this method aspect of the invention may begin (Block 90) with grouping the plurality of nodes 211 into clusters as previously described above and determining QoS node metrics for each node in each cluster, where each QoS node metric again corresponds to a QoS node parameter, at Block 92.

The QoS node parameters are ranked in a node order of importance (Block 93), as described above. One specific ranking example is given in the column labeled "CLN Node Election" in Table 1, although other suitable rankings and/or QoS parameters may be used in other embodiments. Each of the QoS node metrics is again weighted based upon the ranking of QoS node parameters, at Block 94, as similarly described above. Again, this may include generating a weighted sum of the QoS node metrics. The weighted QoS node metrics (or weighted sum thereof) for each node in a given cluster is thus compared with one another, and a cluster leader node is selected for the given cluster based thereon, at Block 95, concluding the method (Block 96). Also, the QoS node metrics may be the same as those described above. Further details regarding cluster leader node designation and node association may be found in the above noted U.S. application Ser. No. 10/134,559.

It will therefore be appreciated by those of skill in the art that the present invention thus provides a mechanism for representing and using generalized link and node metrics to be used in a wide variety of applications ranging from selection of a variety of types of QoS routes to network self-organization. While the above approaches have been described with respect using a weighted sum of QoS metrics, it will also be appreciated that other suitable mathematical operations in addition to summations may be used to provide the appropriate data for comparison. Also, even though in some of the above embodiments only QoS node metrics or link metrics were discussed, it will be appreciated that in various embodiments either one or both types of metrics may potentially be used.

Many other modifications and embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for communicating between a source node and a destination node in a mobile ad-hoc network comprising a plurality of intermediate nodes between the source node and the destination node, the method comprising:
   transmitting a quality-of-service (QoS) route request from the source node to the destination node via the plurality of intermediate nodes to discover routing to the destination node based upon a plurality of QoS parameters;
   transmitting a route request reply from the destination node to the source node;
   determining a plurality of potential routes between the source node and the destination node and a QoS metric corresponding to each of the QoS parameters for each potential route responsive to the QoS route request, the QoS metric comprising a QoS delay-sensitive path metric, a QoS capacity allocation metric, and a cluster metric;
   ranking the QoS parameters in an order of importance;
   weighting each of the QoS metrics based upon the ranking of QoS parameters;
   comparing the weighted QoS metrics and selecting one of the potential routes based thereon; and
   transmitting message data from the source node to the destination node via the selected route.

2. The method of claim 1 further comprising generating a weighted sum of the QoS metrics for each potential route; and wherein the comparing comprises comparing the weighted sums.

3. The method of claim 1 wherein the QoS metrics comprise QoS link metrics and QoS node metrics.

4. The method of claim 3 wherein the QoS link metrics comprise at least one of available bandwidth, error rate, end-to-end delay, end-to-end delay variation, hop count, expected path durability, priority, unidirectionality or bidirectionality, and link capacity.

5. The method of claim 3 wherein the QoS node metrics comprise at least one of battery life, mobility, communications capacity, and position.

6. The method of claim 1 wherein the determining the plurality of potential routes comprises, at each intermediate node:
   determining whether the node can support the requested QoS parameter of the QoS route request and, if so, forwarding the QoS route request to one of other intermediate nodes and the destination node; and
   temporarily reserving node resources for QoS route requests having supportable QoS parameters to define a path of travel.

7. The method of claim 1 further comprising transmitting route confirmations to the intermediate nodes on the selected route prior to transmitting message data.

8. The method of claim 1 further comprising, at each of the intermediate nodes and the destination node, detecting whether the node can continue to support the requested QoS parameter of the QoS route request and, if not, generating and sending a QoS error notification to the source node.

9. The method of claim 1 further comprising, at the source node, selecting at least one standby route.

10. The method of claim 1 further comprising:
    grouping the nodes into a source cluster including the source node, a destination cluster including the destination cluster, and at least one intermediate cluster therebetween including intermediate nodes;
    establishing an adjacent cluster target node in the at least one intermediate cluster for providing a point of access therefor, each potential route including the adjacent cluster target node.

11. The method of claim 10 wherein the establishing the adjacent cluster target node comprises:
    determining target routes between the source node and a plurality of potential target nodes in the at least one intermediate cluster and a QoS target metric corresponding to each of a plurality of QoS target parameters for each target route;
    ranking the QoS target parameters in a target order of importance;
    weighting each of the QoS target metrics based upon the ranking of QoS target parameters; and
    comparing the weighted QoS target metrics and selecting the adjacent cluster target node based thereon.

12. The method of claim 11 further comprising generating a weighted sum of the QoS target metrics for each potential route; and wherein the comparing the weighted QoS target metrics comprises comparing the weighted sums of the target metrics.

13. The method of claim 11 wherein the QoS target metrics comprise at least one of available bandwidth, error rate, end-to-end delay, end-to-end delay variation, hop count, expected path durability, priority, unidirectionality or bidirectionality, and link capacity.

14. A method for communicating between a source node and a destination node in a mobile ad-hoc network comprising a plurality of intermediate nodes between the source node and the destination node, the method comprising:
    grouping the nodes into a source cluster including the source node, a destination cluster including the destination node, and at least one intermediate cluster therebetween including intermediate nodes;
    transmitting a route request reply from the destination node to the source node;
    determining target routes between the source node and a plurality of potential target nodes in the at least one intermediate cluster and a QoS metric corresponding to each of a plurality of QoS parameters for each target route, the QoS metric comprising a QoS delay-sensitive path metric, a QoS capacity allocation metric, and a cluster metric;
    ranking the QoS parameters in an order of importance;
    weighting each of the QoS metrics based upon the ranking of QoS parameters;
    comparing the weighted QoS metrics and selecting an adjacent cluster target node based thereon;
    selecting a route between the source node and the destination node through the at least one intermediate cluster and including the adjacent cluster target node; and
    transmitting message data from the source node to the destination node via the selected route.

15. The method of claim 14 further comprising generating a weighted sum of the QoS metrics for each potential route; and wherein the comparing comprises comparing the weighted sums.

16. The method of claim 14 wherein the QoS metrics comprise at least one of available bandwidth, error rate, end-to-end delay, end-to-end delay variation, hop count, expected path durability, priority, unidirectionality or bidirectionality, and link capacity.

17. The method of claim 14 further comprising selecting at least one standby route.

18. A node organization method for a mobile ad-hoc network comprising a plurality of nodes, the method comprising:
grouping the plurality of nodes into clusters;
determining a cluster metric based upon quality of service (QoS) node metrics for each node in each cluster, each QoS node metric corresponding to a QoS node parameter, the QoS node metrics comprising a QoS capacity allocation metric;
ranking the QoS node parameters in a node order of importance;
weighting each of the QoS node metrics based upon the ranking of QoS node parameters; and
comparing the weighted QoS node metrics for each node in a given cluster with one another and selecting a given cluster leader node for the cluster based thereon.

19. The method of claim 18 further comprising generating a weighted sum of the QoS node metrics for each node; and wherein the comparing comprises comparing the weighted sums for each node in the given cluster with one another.

20. The method of claim 18 further comprising:
providing an additional node to be included in the mobile ad-hoc network;
establishing a route from the additional node to at least one node in each of the clusters based upon a route request reply transmitted from the at least one node to the additional node;
determining QoS link metrics for each route, each QoS link metric corresponding to a QoS link parameter;
ranking the QoS link parameters in a link order of importance;
weighting each of the QoS link metrics based upon the ranking of QoS link parameters; and
comparing the weighted QoS link metrics and associating the additional node with one of the clusters based thereon.

21. The method of claim 20 wherein the QoS link metrics comprise at least one of available bandwidth, error rate, end-to-end delay, end-to-end delay variation, hop count, expected path durability, priority, unidirectionality or bidirectionality, and link capacity.

22. The method of claim 20 further comprising generating a weighted sum of the QoS link metrics for each route; and wherein the comparing the weighted QoS link metrics comprises comparing the weighted sums of the QoS link metrics.

23. The method of claim 20 further comprising establishing a route from the additional node to each cluster leader node.

24. The method of claim 18 wherein the QoS node metrics comprise at least one of battery life, mobility, communications capacity, and position.

25. A node organization method for a mobile ad-hoc network comprising a plurality of nodes, the method comprising:
grouping the plurality of nodes into clusters;
providing an additional node to be included in the mobile ad-hoc network;
establishing a route from the additional node to at least one node in each of the clusters based upon a route request reply transmitted from the at least one node to the additional node;
determining a cluster metric based upon QoS link metrics for each route, each QoS link metric corresponding to a QoS link parameter, the QoS link metrics comprising a QoS delay-sensitive path metric;
ranking the QoS link parameters in a order of importance;
weighting each of the QoS link metrics based upon the ranking of QoS link parameters; and
comparing the weighted QoS link metrics and associating the additional node with one of the clusters based thereon.

26. The method of claim 25 further comprising generating a weighted sum of the QoS link metrics for each route; and wherein the comparing the weighted QoS link metrics comprises comparing the weighted sums of the QoS link metrics.

27. The method of claim 25 wherein the QoS link metrics comprise at least one of available bandwidth, error rate, end-to-end delay, end-to-end delay variation, hop count, expected path durability, priority, unidirectionality or bidirectionality, and link capacity.

28. The method of claim 25 further comprising designating a cluster leader node for each of the clusters; and wherein the establishing comprises establishing a route from the additional node to each cluster node.

29. A mobile ad-hoc network comprising:
a source node;
a destination node; and
a plurality of intermediate nodes between said source node and said destination node;
said source node for
transmitting a quality-of-service (QoS) route request to said destination node via said plurality of intermediate nodes to discover routing to said destination node based upon a plurality of QoS parameters,
receiving a route request reply from said destination node,
receiving a plurality of potential routes to said destination node and a QoS metric corresponding to each of the QoS parameters for each potential route responsive to the QoS route request, the QoS metric comprising a QoS delay-sensitive path metric, a QoS capacity allocation metric, and a cluster metric,
ranking the QoS parameters in an order of importance,
weighting each of the QoS metrics based upon the ranking of QoS parameters,
comparing the weighted QoS metrics and selecting one of the potential routes based thereon, and
transmitting message data to said destination node via the selected route.

30. The mobile ad-hoc network of claim 29 wherein said source node generates a weighted sum of the QoS metrics for each potential route and compares the weighted QoS metrics by comparing the weighted sums.

31. The mobile ad-hoc network of claim 29 wherein the QoS metrics comprise QoS link metrics and QoS node metrics.

32. The mobile ad-hoc network of claim 31 wherein the QoS link metrics comprise at least one of available bandwidth, error rate, end-to-end delay, end-to-end delay variation, hop count, expected path durability, priority, unidirectionality or bidirectionality, and link capacity.

33. The mobile ad-hoc network of claim 31 wherein the QoS node metrics comprise at least one of battery life, mobility, communications capacity, and position.

34. A mobile ad-hoc network comprising:
a source node;
a destination node; and
a plurality of intermediate nodes between said source node and said destination node;
said nodes being grouped into a source cluster including said source node, a destination cluster including said destination node, and at least one intermediate cluster therebetween including intermediate nodes;
said source node for
   receiving a route request reply from said destination node,
   determining target routes to potential target nodes in the at least one intermediate cluster and a QoS metric corresponding to each of a plurality of QoS parameters for each target route, the QoS metric comprising a QoS delay-sensitive path metric, a QoS capacity allocation metric, and a cluster metric,
   ranking the QoS parameters in an order of importance,
   weighting each of the QoS metrics based upon the ranking of QoS parameters,
   comparing the weighted QoS metrics and selecting an adjacent cluster target node based thereon,
   selecting a route to said destination node through said at least one intermediate cluster and including said adjacent cluster target node, and
   transmitting message data to said destination node via the selected route.

35. The mobile ad-hoc network of claim 34 wherein said source node generates a weighted sum of the QoS metrics for each potential route and compares the weighted QoS metrics by comparing the weighted sums.

36. The mobile ad-hoc network of claim 34 wherein the QoS metrics comprise at least one of available bandwidth, error rate, end-to-end delay, end-to-end delay variation, hop count, expected path durability, priority, unidirectionality or bidirectionality, and link capacity.

37. The mobile ad-hoc network of claim 34 wherein said source node further selects at least one standby route to said destination node.

38. A mobile ad-hoc network comprising:
a plurality of nodes grouped into clusters;
said nodes in each of said clusters selecting a cluster leader node therefrom by
   determining a cluster metric based upon quality of service (QoS) node metrics for each node in each cluster, each QoS node metric corresponding to a QoS node parameter, the QoS node metrics comprising a QoS capacity allocation metric;
   ranking the QoS node parameters in a node order of importance;
   weighting each of the QoS node metrics based upon the ranking of QoS node parameters; and
   comparing the weighted QoS node metrics for each node in a given cluster with one another and selecting the cluster leader node for the given cluster based thereon.

39. The mobile ad-hoc network of claim 38 wherein said nodes in each cluster further generate a weighted sum of the QoS node metrics for each node and compare the weighted sums for each node in the given cluster leader node therefor.

40. The mobile ad-hoc network of claim 39 wherein the QoS node metrics comprise at least one of battery life, mobility, communications capacity, and position.

41. A mobile ad-hoc network comprising:
a plurality of nodes grouped into clusters; and
an additional node for selecting one of said clusters to associate with by
   establishing a route to at least one node in each of the clusters based upon a route request reply received from the at least one node;
   determining a cluster metric based upon QoS link metrics for each route, each QoS link metric corresponding to a QoS link parameter, the QoS link metrics comprising a QoS delay-sensitive path metric;
   ranking the QoS link parameters in a order of importance;
   weighting each of the QoS link metrics based upon the ranking of QoS link parameters; and
   comparing the weighted QoS link metrics and selecting said cluster for association therewith based thereon.

42. The mobile ad-hoc network of claim 41 wherein said additional node generates a weighted sum of the QoS link metrics for each route and compares the weighted QoS link metrics by comparing the weighted sums of the QoS link metrics to select said cluster for association therewith.

43. The mobile ad-hoc network of claim 42 wherein the QoS link metrics comprise at least one of available bandwidth, error rate, end-to-end delay, end-to-end delay variation, hop count, expected path durability, priority, unidirectionality or bidirectionality, and link capacity.

* * * * *